United States Patent [19]

Eppler

[11] 4,376,169

[45] Mar. 8, 1983

[54] LOW-MELTING, LEAD-FREE CERAMIC FRITS

[75] Inventor: Richard A. Eppler, Timonium, Md.

[73] Assignee: Mobay Chemical Corporation, Pittsburgh, Pa.

[21] Appl. No.: 372,592

[22] Filed: Apr. 28, 1982

[51] Int. Cl.³ .......................... C03C 1/00; C03C 3/08; C03C 5/00

[52] U.S. Cl. ........................................ 501/24; 501/25; 501/26; 501/59; 501/63; 501/67; 501/79

[58] Field of Search ....................... 501/24, 25, 26, 59, 501/63, 67, 79

[56] References Cited

U.S. PATENT DOCUMENTS

| | | | |
|---|---|---|---|
| 2,642,633 | 6/1953 | Dalton | 20/56.5 |
| 3,113,878 | 12/1963 | Martin | 106/54 |
| 3,258,350 | 6/1966 | Martin et al. | 106/47 |
| 3,404,027 | 10/1968 | Kosiorek | 117/124 |
| 3,873,330 | 3/1975 | Sherk et al. | 106/47 |
| 4,221,824 | 9/1980 | Leonard | 501/24 |
| 4,312,951 | 1/1982 | Eppler | 501/24 |
| 4,340,645 | 7/1982 | O'Conor | 501/26 |

*Primary Examiner*—Mark Bell

*Attorney, Agent, or Firm*—Gene Harsh; Joseph C. Gil; Lyndanne M. Whalen

[57] ABSTRACT

A lead-free low-melting frit is made by combining raw materials in amounts such that the product will have a specific oxide analysis, melting the raw materials at a temperature greater than 1000° C. and cooling the thus-formed fused glass in a manner such that a frit is formed. The low-melting frit has the following oxide analysis:

7-12.5 parts by weight alkali oxide selected from
   2-9 parts by weight $Na_2O$ and 2-7 parts by weight $Li_2O$;

23-34 parts by weight $B_2O_3$;

2-4 parts by weight $Al_2O_3$;

30-45 parts by weight $SiO_2$;

0.75-4 parts by weight F;

2-4 parts by weight $P_2O_5$;

4-8 parts by weight ZnO; and 2-5 parts by weight $TiO_2$.

These frits are durable, have an incipient fusion point less than about 450° C. and a coefficient of thermal expansion less than $10 \times 10^{-6}$ cm/cm/°C. The frits of the present invention are particularly useful as components in vitrifiable glass decorating colors.

5 Claims, No Drawings

LOW-MELTING, LEAD-FREE CERAMIC FRITS

BACKGROUND OF THE INVENTION

The present invention relates to low-melting, lead-free ceramic frits.

Coatings such as vitrifiable glass decorating colors require a low-melting ceramic frit which can be applied to a substrate and fused into a ceramic coating at a temperature of about 550° C. to 700° C. However, such a frit formulation must also have an expansion less than $10 \times 10^{-6}$ cm/cm/°C. and must be at least moderately durable. Appropriate low-melting frits have an incipient fusion point less than about 450° C. as measured by the dilatometer method of coefficient of thermal expansion. The durability of a glass frit can be measured by exposing glass frit powder to various attacking agents for a specified test period and at a specified temperature. For instance, a glass frit powder sample of $-100/+200$ mesh particle size, exposed to distilled water at 100° C. for one hour and exhibiting total solubility of frit in water of less than 5% by weight, would be considered moderately durable.

It is well known in the art of ceramics that lower expansion and higher durability may generally be obtained if the melting temperature is increased. Therefore, frit materials which are low-melting yet also have lower expansion and higher durability are difficult to achieve. Conventional approaches to compounding frits which are simultaneously low-melting, lower in expansion and moderately durable have included use of lead borosilicate systems (such as those disclosed in U.S. Pat. Nos. 3,258,350, 2,642,633 and 3,404,027) or of lead zinc borosilicate systems (such as those disclosed in U.S. Pat. Nos. 3,873,330 and 3,258,350). However, these lead borosilicate systems have highly toxic lead oxide as their major constituent. This toxic lead oxide must be carefully handled during processing to avoid ingestion or inhalation.

Nontoxic, lead-free frit systems which are low-melting, moderate in expansion and moderately durable are not, however, known in the art. Some alkali borosilicate glasses are adequately low-melting, but they are not durable, and they exhibit very high expansion. Other alkali borosilicates such as those sold under the trademarks Pyrex (Corning Glass Works) and Kimax (Owens-Illnois, Inc.) are durable, low expansion glasses, but they exhibit high-melting properties. Blending or use of an admixture of such borosilicates does not, however, yield a frit having the desired low-melting, moderate expansion and moderate durability characteristics. Alkali phosphate glasses or arsenic-selenium-tellurium-antimony glasses provide adequate low-melting properties, but they exhibit such poor durability that they are soluble in water at moderate temperatures. Zinc borosilicates such as those disclosed in U.S. Pat. No. 3,113,878 may provide moderate durability and moderate expansion characteristics; however, such systems do not produce satisfactory low-melting frits.

U.S. Pat. No. 4,312,951 discloses low-melting, lead-free ceramic frits which have an incipient fusion point less than about 475° C. and which are very durable. However, the coefficient of thermal expansion of these materials is generally in excess of $10 \times 10^{-6}$ cm/cm/°C. Consequently, for applications on glass and most ceramic substrates these materials are not suitable because coatings made with them would craze on firing.

SUMMARY OF THE INVENTION

It is an object of the present invention to provide a lead-free, low-melting frit composition having an incipient fusion point below 450° C.

It is also an object of the present invention to provide a lead-free, low-melting frit composition which is durable and has a coefficient of thermal expansion less than $10 \times 10^{-6}$ cm/cm/°C.

It is another object of the present invention to provide a process for the production of a lead-free, low-melting frit which is moderately durable.

These and other objects which will become apparent from the description below are accomplished by mixing a batch of raw materials and melting that batch at a temperature greater than 1000° C. The raw materials are selected so that upon melting the glass formulation consists essentially of:

7–12.5 parts by weight alkali oxide,
23–34 parts by weight $B_2O_3$,
2–4 parts by weight $Al_2O_3$,
30–45 parts by weight $SiO_2$,
0.75–4 parts by weight F,
2–4 parts by weight $P_2O_5$,
4–8 parts by weight ZnO, and
2–5 parts by weight $TiO_2$.

DETAILED DESCRIPTION OF THE INVENTION

This invention pertains to vitreous ceramic frits which are particularly suitable for use as components in vitrifiable glass decorating colors, as well as similar ceramic coatings. These materials are prepared by mixing together oxide producing materials such as alumina, conventional ceramic oxide, carbonate, fluoride or silicofluoride raw materials in amounts which yield a glass formulation upon melting having the oxide analysis given below. Suitable raw materials include alumina, anhydrous borax, boric acid, calcium carbonate, lithium carbonate, lithium fluoride, magnesium oxide, molybdenum trioxide, monoammonium phosphate, silica, sodium carbonate, sodium silicofluoride, sodium tripolyphosphate, titania, zinc oxide and similar raw materials. The raw material mix can be charged into a glass-melting furnace at temperatures of 1000° to 1200° C. to produce fused glass. The glass is subsequently fritted, either by pouring into water or by pouring through a pair of water-cooled rolls. If necessary, the frit can then be comminuted to powder by conventional grinding operations. The result of this processing is a homogeneous glass frit having a formulation, in parts by weight based on a total of approximately 100 parts by weight, consisting essentially of:

| Component | Broad Range (parts by wt.) | Preferred Range (parts by wt.) |
| --- | --- | --- |
| $Na_2O$ | 2–9 | 3–8 |
| $Li_2O$ | 2–7 | 3–7 |
| $B_2O_3$ | 23–34 | 23–28 |
| $Al_2O_3$ | 2–4 | 2.5–4 |
| $SiO_2$ | 30–45 | 35–45 |
| F | 0.75–4 | 1–3 |
| $P_2O_5$ | 2–4 | 2–3.5 |
| ZnO | 4–8 | 5–8 |
| $TiO_2$ | 2–5 | 3–5 |

The sum of $Na_2O$ and $Li_2O$ must be within the range of 7–12.5 parts, preferably 9–12.5 parts.

In addition to the oxides listed above, MgO or CaO may be present in amounts up to 2.0 parts by weight, although they are not desirable since MgO and CaO generally have a deleterious effect upon the melting temperature. Similarly, up to 4.0 parts by weight of zirconia may be included in the formulation, if necessary, to give improved alkaline resistance, although the inclusion of zirconia is not preferred.

In compounding the raw batch from which this frit or glass is made, substantially higher concentrations of fluorine than will be present in the product frit must be included in the raw batch in order to allow for loss due to volatilization. Generally, from 2.0 to 13.0 parts by weight of fluorine must be added to the broad range of parts by weight (preferably from 5.0 to 11.0 parts by weight) to give the required fluorine content in the product frit.

Aside from the oxides mentioned above, oxides of other divalent ions such as cadmium oxide, strontium oxide and barium oxide should not be present in significant quantities. Refractory oxides such as tin oxide and colored oxides such as chromium oxide, iron oxide, vanadium pentoxide and copper oxide, etc., should not generally be included in the frit composition of the present invention unless a colored product is desired or acceptable.

The compositional limits of the frit composition of the present invention are critical. When the concentration of alkali is less than 7 parts by weight, the requisite low-melting cannot be achieved. On the other hand, when the concentration of alkali is greater than 12.5 parts by weight, the coefficient of expansion will be excessive. Similarly, when the concentration of boron oxide is below 23 parts by weight, the requisite low-melting cannot be achieved; and when the boron oxide is above 34 parts by weight, the solubility of the frit becomes excessive. To achieve the desired low-melting behavior, at least 2 parts by weight of phosphorous pentoxide and titanium dioxide and at least 4 parts by weight of zinc oxide must be present in the frit of the present invention. When the concentration of $P_2O_5$ is above 4 parts by weight, the solubility becomes excessive. When the concentration of zinc oxide is increased above 8 parts by weight, either opacification is encountered or the concentration of the other flux constituents is reduced to such an extent that the frit is no longer low-melting. When the concentration of titanium dioxide is increased above 5 parts by weight, opacification is often encountered. When the concentration of aluminum oxides is reduced below 2%, opacification is encountered. When more than 4% aluminum oxide is present, the frit is no longer low-melting. When the concentration of silica is reduced below 30%, the solubility of the frit and the coefficient of thermal expansion become excessive. If the silica content of the frit is above 45%, the requisite low-melting is no longer achievable. When the fluorine content is below ¾ of a percent, the requisite low-melting is no longer achievable. It is not practical, however, to add sufficient fluorine to raise the retained amount of fluorine above 4 parts without lowering the smelting temperature to undesirable levels.

The frits of the present invention are particularly useful for vitrifiable glass decorating colors, but they may also be used in related applications such as coatings on ceramic substrates. For example, to use these materials as a glass decorating color, a slip made up of the frit of the present invention, titanium dioxide and an alcohol-water mixture is prepared. This slip is then applied to the exterior of a glass jar or a light bulb (e.g., by spraying) and the coated surface is then fired at 680° C. for three minutes. The result is a smooth vitreous coating which will resist attack from either hydrogen sulfide or citric acid at room temperature.

The materials of this invention represent substantial improvements over lead borosilicates, lead zinc borosilicates and similar systems in which titanium dioxide is included. In the prior art systems, lead oxide is a major constituent which must be handled with care during manufacture in order to avoid ingestion or inhalation. The lead-free glasses or frits of this invention which are free of deleterious lead oxide do not, however, require such careful handling. In addition to their low-melting and durability characteristics, the expansion of the frits of this invention is sufficiently low that there will be no tendency to craze during the firing operation as did prior art lead-free systems.

The following examples show ways in which this invention has been practiced, but should not be construed as limiting the same. All parts and percentages given in these Examples are parts or percentages by weight unless otherwise indicated.

EXAMPLES

Example 1

The raw materials necessary to yield 7.82 parts of $Na_2O$, 4.13 parts of $Li_2O$, 24.45 parts of $B_2O_3$, 2.47 parts of $P_2O_5$, 7.33 parts of ZnO, 3.91 parts of $TiO_2$, 3.14 parts of $Al_2O_3$, 39.90 parts of $SiO_2$ and 6.85 parts of F (including volatilized F) were weighed out and blended in a V-cone blender with an intensifier bar. The raw materials used were as follows:

| Raw Materials | Parts by weight |
|---|---|
| Silica (sold by Pennsylvania Glass Sand Company under the designation Morgan 200-Mesh Supersil Silica) | 25.60 |
| Zinc Oxide (sold by Pigment and Chemical Co., Ltd. under the designation Canfelzo 216) | 5.75 |
| Boric Acid | 33.90 |
| Sodium Silicofluoride | 18.05 |
| Technical Grade Lithium Carbonate | 8.00 |
| Titania (NL Industries sold under the designation Titanox 3030) | 3.05 |
| Alumina (sold by Aluminum Company of America under the designation A-1) | 2.45 |
| Technical Grade Monoammonium Phosphate | 2.55 |
| Sodium Tripolyphosphate | 0.65 |

After blending, the raw materials were melted at 1125° C. for 30 minutes. The resulting glass frit was poured into water and then dried. The dried frit was placed in a ball mill and reduced to a powder. 5% of the powdered frit was retained on a 200 mesh Tyler Screen (95% passed through). The resulting frit had the following composition: 7.82 parts $Na_2O$, 4.13 parts $Li_2O$, 24.45 parts $B_2O_3$, 2.47 parts $P_2O_5$, 7.33 parts ZnO, 3.91 parts $TiO_2$, 3.14 parts $Al_2O_3$, 39.90 parts $SiO_2$ and 2.6 parts F. The frit had an incipient fusion point (as measured on a dilatometer) of 445° C. and a solubility in water of 0.68% (measured by exposure to water at 100° C. for one hour). The coefficient of thermal expansion was $9.2 \times 10^{-6}$ cm/cm/°C. The fluidity of this frit was also indicated by the results of the so-called donut test (for further description see *Amer. Ceram. Soc. Bull.,* 53:443-45, 1974) wherein donut-shaped specimens of pressed powder are heated in the furnace until appreciable softening occurs. The diameter of the inner hole of the donut is then measured. The results are then adjusted to a common standard for comparison purposes. The result for this frit was 0.66. By comparison, materials which are marginal for the uses to which these products are to be put generally have a donut reading of approximately 2.0.

minutes. The resulting glass frits were poured into water and then dried. The dried frit was placed in a ball mill and reduced to a powder until 5% was retained on a 200 mesh Tyler Screen. The resulting frits had the compositions given in Table II. The fluorine in the frit is that given as "F-in-frit". The properties of these frits are also given in Table II. In the indicated compositions, donut test readings were less than 2.0, the incipient fusion points were less than 450° C., the solubilities were less than 5% and the coefficients of thermal expansion were less than $10 \times 10^{-6}$ cm/cm/°C.

TABLE I

| Raw Material | Example | | | | | | | | | |
|---|---|---|---|---|---|---|---|---|---|---|
| | 3 | 4 | 5 | 6 | 7 | 8 | 9 | 10 | 11 | 12 |
| Silica | 26.9 | 25.3 | 26.6 | 22.3 | 19.9 | 20.8 | 21.7 | 25.8 | 19.0 | 30.3 |
| Zinc Oxide | 4.6 | 5.4 | 5.8 | 5.7 | 5.5 | 5.5 | 5.6 | 5.9 | 5.4 | 6.1 |
| Boric Acid | 38.3 | 36.7 | 34.2 | 37.5 | 41.7 | 42.1 | 39.7 | 34.4 | 44.5 | 35.7 |
| Sodium Silicofluoride | 15.2 | 16.3 | 15.9 | 17.9 | 17.2 | 15.1 | 17.5 | 19.2 | 14.8 | 8.5 |
| Technical Grade Lithium Carbonate | 3.7 | 6.4 | 7.2 | 7.9 | 7.6 | 6.8 | 7.7 | — | 6.7 | 3.5 |
| Titania | 3.1 | 3.0 | 3.1 | 2.8 | 2.5 | 2.5 | 2.7 | 3.1 | 2.3 | 3.2 |
| Alumina | 2.5 | 2.4 | 2.5 | 2.2 | 2.0 | 2.0 | 2.2 | 2.5 | 1.9 | 2.6 |
| Technical Grade Mono-ammonium Phosphate | 3.8 | 3.5 | 3.2 | 3.1 | 3.2 | 3.8 | 3.0 | 3.2 | 4.1 | 3.3 |
| Sodium Tripolyphosphate | — | — | — | 6.5 | 6.0 | — | 6.5 | — | — | — |
| Lithium Fluoride | 2.1 | 1.3 | 1.6 | — | — | 1.5 | — | 6.0 | 1.4 | 6.9 |

TABLE II

| | Example No. | | | | | | | | | |
|---|---|---|---|---|---|---|---|---|---|---|
| | 3 | 4 | 5 | 6 | 7 | 8 | 9 | 10 | 11 | 12 |
| Component | | | | | | | | | | |
| $Na_2O$ | 6.26 | 6.77 | 6.55 | 7.94 | 7.75 | 6.49 | 7.78 | 7.53 | 6.47 | 3.39 |
| $Li_2O$ | 3.31 | 4.21 | 4.85 | 4.19 | 4.10 | 4.76 | 4.11 | 3.98 | 4.74 | 6.45 |
| $B_2O_3$ | 27.46 | 26.62 | 24.62 | 27.63 | 31.42 | 31.63 | 29.09 | 23.53 | 33.95 | 25.03 |
| $P_2O_5$ | 2.94 | 2.76 | 2.48 | 2.96 | 3.09 | 3.11 | 2.90 | 2.38 | 3.35 | 2.53 |
| ZnO | 5.86 | 6.92 | 7.38 | 7.43 | 7.26 | 7.31 | 7.29 | 7.06 | 7.29 | 7.50 |
| $TiO_2$ | 3.90 | 3.80 | 3.94 | 3.56 | 3.25 | 3.28 | 3.49 | 3.77 | 3.01 | 4.00 |
| $Al_2O_3$ | 3.15 | 3.00 | 3.16 | 2.89 | 2.65 | 2.67 | 2.84 | 3.02 | 2.51 | 3.22 |
| $SiO_2$ | 40.22 | 39.00 | 40.17 | 36.44 | 33.68 | 33.91 | 35.70 | 38.40 | 31.86 | 40.85 |
| F (in batch) | 6.90 | 6.92 | 6.90 | 6.95 | 6.79 | 6.83 | 6.81 | 10.35 | 6.81 | 7.01 |
| (in frit) | 2.6 | 2.6 | 2.6 | 2.6 | 2.6 | 2.6 | 2.6 | 2.8 | 2.6 | 2.6 |
| Properties | | | | | | | | | | |
| Donut Test | 0.66 | 0.61 | 0.66 | 0.57 | 0.74 | 0.53 | 0.53 | 0.63 | 0.78 | 1.90 |
| Incipient Fusion Point (°C.) | 415° | 450° | 440° | 445° | 415° | 430° | 430° | 450° | | |
| Solubility (%) | 3.73 | 1.51 | 0.82 | 1.44 | 2.89 | 4.65 | 3.95 | 0.67 | | |
| Coefficient of Expansion ($\times 10^{-6}$ cm/cm/°C.) | 8.5 | 9.0 | 9.6 | 9.6 | 9.3 | 9.2 | 9.4 | 8.9 | | |

Example 2

92 parts of the frit prepared in Example 1 were mixed with 8 parts anatase, 24 parts of water, 8 parts of denatured ethyl alcohol, 0.187 parts of sodium nitrite, 0.061 parts wetting agent sold by Rohm & Haas under the designation Triton X-100, 0.062 octyl alcohol and 2 parts of butyl carbitol. This mixture was sprayed onto the exterior of a light bulb and fired at 670° C. for 3 minutes. The result was a white coating on a light bulb which withstood 15 minutes' exposure to either hydrogen sulfide or citric acid without deterioration of the coating.

Examples 3-12

The raw materials necessary to yield the batches given in parts by weight in Table I were separately weighed out and blended in a V-cone blender with an intensifier bar. The amount of fluorine added including vaporized fluorine is that listed under "F-in-batch" in Table II. These frits were then melted at 1125° C. for 30

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A lead-free, low-melting frit composition having an incipient fusion point below about 450° C. and a coefficient of thermal expansion less than $10 \times 10^{-6}$ cm/cm/°C., consisting essentially of (in parts by weight based on a total of approximately 100 parts by weight):
   (a) 7-12.5 parts alkali oxide selected from 2-9 parts $Na_2O$ and 2-7 parts $Li_2O$;
   (b) 23-34 parts $B_2O_3$;
   (c) 2-4 parts $Al_2O_3$;
   (d) 30-45 parts $SiO_2$;
   (e) 0.75-4 parts F;
   (f) 2-4 parts $P_2O_5$;
   (g) 4-8 parts ZnO; and
   (h) 2-5 parts $TiO_2$.

2. The lead-free glass frit composition of claim 1 consisting essentially of:
  (a) 9-12.5 parts alkali oxide selected from 3-8 parts Na$_2$O and 3-7 parts Li$_2$O;
  (b) 23-28 parts B$_2$O$_3$;
  (c) 2.5-4 parts Al$_2$O$_3$;
  (d) 35-45 parts SiO$_2$;
  (e) 1-3 parts F;
  (f) 2-3.5 parts P$_2$O$_5$;
  (g) 5-8 parts ZnO; and
  (h) 3-5 parts TiO$_2$.

3. The lead-free glass frit composition of claim 1 in which 0 to 2 parts MgO are present.

4. The lead-free glass frit composition of claim 1 in which 0 to 2 parts CaO are present.

5. A process for the production of a lead-free durable glass frit having an incipient fusion point less than about 450° C. and a coefficient of thermal expansion less than 10×10$^{-6}$ cm/cm/°C. comprising:

(A) combining batch materials in amounts such that the glass frit will have the following oxide analysis (based on a total of approximately 100 parts by weight):
  (a) 7-12.5 parts by weight alkali oxide selected from 2-9 parts by weight Na$_2$O and 2-7 parts by weight Li$_2$O;
  (b) 23-34 parts by weight B$_2$O$_3$;
  (c) 2-4 parts by weight Al$_2$O$_3$;
  (d) 30-45 parts by weight SiO$_2$;
  (e) 0.75-4 parts by weight F;
  (f) 2-4 parts by weight P$_2$O$_5$;
  (g) 4-8 parts by weight ZnO; and
  (h) 2-5 parts by weight TiO$_2$;

(B) melting the batch materials at a temperature greater than 1000° C. (to form fused glass); and (C) cooling the fused glass in a manner such that a frit is formed.

* * * * *